United States Patent
Zhang et al.

(10) Patent No.: US 12,439,034 B2
(45) Date of Patent: Oct. 7, 2025

(54) DETERMINATION METHOD FOR CHROMA INTRA PREDICTION MODE AND IMAGE ENCODING DEVICE

(71) Applicant: SigmaStar Technology Ltd., Fujian (CN)

(72) Inventors: Shaobo Zhang, Shanghai (CN); Jianqiang Du, Shanghai (CN); Chengwei Zheng, Shanghai (CN); Qun Wang, Shanghai (CN); Zhenbao Huang, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 0 days.

(21) Appl. No.: 18/791,861

(22) Filed: Aug. 1, 2024

(65) Prior Publication Data
US 2025/0071270 A1 Feb. 27, 2025

(30) Foreign Application Priority Data
Aug. 22, 2023 (CN) .......................... 202311061244.6

(51) Int. Cl.
| | |
|---|---|
| *H04N 19/11* | (2014.01) |
| *H04N 19/136* | (2014.01) |
| *H04N 19/147* | (2014.01) |
| *H04N 19/176* | (2014.01) |
| *H04N 19/182* | (2014.01) |
| *H04N 19/186* | (2014.01) |
| *H04N 19/593* | (2014.01) |

(52) U.S. Cl.
CPC .......... *H04N 19/11* (2014.11); *H04N 19/136* (2014.11); *H04N 19/147* (2014.11); *H04N 19/176* (2014.11); *H04N 19/182* (2014.11); *H04N 19/186* (2014.11); *H04N 19/593* (2014.11)

(58) Field of Classification Search
CPC .. H04N 19/186; H04N 19/147; H04N 19/176; H04N 19/593; H04N 19/11; H04N 19/182; H04N 19/136
See application file for complete search history.

(56) References Cited

U.S. PATENT DOCUMENTS

| 11,750,804 B2 * | 9/2023 | Taquet ................. H04N 19/117 |
| | | 375/240.02 |
| 12,015,795 B2 * | 6/2024 | Zhang .................... H04N 19/46 |

(Continued)

*Primary Examiner* — Tsion B Owens
(74) *Attorney, Agent, or Firm* — Edell, Shapiro & Finnan, LLC

(57) ABSTRACT

A determination method for a chroma intra prediction mode includes: performing a simple RDO calculation on a luminance value of each pixel of an image block to obtain multiple luminance candidate modes; determining multiple chroma candidate modes according to one of the luminance candidate modes and a chroma simple RDO result calculated by performing a simple RDO calculation on a chroma value of each pixel of the image block; performing a full RDO calculation of the multiple luminance candidate modes on the luminance value of each pixel in the image block to select a luminance target mode; performing a full RDO calculation of the multiple chroma candidate modes on the chroma value of each pixel of the image block to a obtain chroma full RDO result; and determining a chroma target mode according to the luminance target mode and the chroma full RDO result.

14 Claims, 6 Drawing Sheets

(56) References Cited

U.S. PATENT DOCUMENTS

| | | | |
|---|---|---|---|
| 12,088,816 B2* | 9/2024 | Li | H04N 19/70 |
| 2015/0010067 A1* | 1/2015 | Yie | H04N 19/14 |
| | | | 375/240.03 |
| 2021/0281831 A1* | 9/2021 | Alshin | H04N 19/11 |
| 2022/0400261 A1* | 12/2022 | Grois | H04N 19/147 |
| 2024/0251092 A1* | 7/2024 | Ma | H04N 19/70 |
| 2025/0097437 A1* | 3/2025 | Ma | H04N 19/593 |

* cited by examiner

DETERMINATION METHOD FOR CHROMA INTRA PREDICTION MODE AND IMAGE ENCODING DEVICE

This application claims the benefit of China application Serial No. CN202311061244.6, filed on Aug. 22, 2023, the subject matter of which is incorporated herein by reference.

BACKGROUND OF THE INVENTION

Field of the Invention

The present application relates to the technical field of video encoding, and more particularly, to a determination method for chroma intra prediction mode and an image encoding device.

Description of the Related Art

The High Efficiency Video Coding (HEVC) standard defines 35 luminance intra prediction modes (including a planar mode, a DC mode and 33 different angle modes) and 5 chroma intra prediction modes (respectively a planar mode, a DC mode, a horizontal mode, a vertical mode and a derived mode (DM mode)). The DM mode represents a mode that applies an intra prediction mode same as an intra prediction mode of a luminance component as an intra prediction mode of a chroma component. In the DM mode, a chroma intra prediction mode is set to be the same as a luminance optimal intra prediction mode. The encoding efficiency can be improved when chroma is encoded by the DM mode, so that a bit amount of transmissions of an encoded video can be reduced. However, luminance and chroma are usually encoded in parallel during encoding in practice, such that an optimal mode of the luminance may not be acquired in time for the chroma and the DM mode then cannot be used as a result.

SUMMARY OF THE INVENTION

It is an object of the present application to provide a determination method for a chroma intra prediction mode and an image encoding device so improve the issues above.

In some embodiments, a determination method for a chroma intra prediction mode includes: performing a simple rate-distortion optimization (RDO) calculation on a luminance value of each pixel of an image block to obtain multiple luminance candidate modes; determining multiple chroma candidate modes according to one of the luminance candidate modes and a chroma simple RDO result calculated by performing a simple RDO calculation on the chroma value of each pixel of the image block; performing a full RDO calculation corresponding to the multiple luminance candidate modes on the luminance value of each pixel in the image block to select a luminance target mode; performing a full RDO calculation corresponding to the multiple chroma candidate modes on the chroma value of each pixel of the image block to obtain chroma full RDO results; and determining a chroma target mode according to the luminance target mode and the chroma full RDO results. The simple RDO calculation performed on the luminance value of each pixel of the image block and the simple RDO calculation performed on the chroma value of each pixel of the image block are performed in parallel.

In some embodiments, the image decoding device includes a luminance candidate mode circuit, a chroma candidate mode circuit, a luminance target mode circuit, a chroma full RDO calculation circuit and a chroma target mode circuit. The luminance candidate mode circuit obtains a luminance value of each pixel of an image block from a memory, and performs a simple RDO calculation on the luminance value of each pixel of the image block to obtain multiple luminance candidate modes. The chroma candidate mode circuit acquires a chroma value of each pixel of the image block from the memory, and determines multiple chroma candidate modes according to one of the multiple luminance candidate modes and a chroma simple RDO result calculated by performing a simple RDO calculation on the chroma value of each pixel of the image block. The luminance target mode circuit performs a full RDO calculation corresponding to the multiple luminance candidate modes on the luminance value of each pixel in the image block to select a luminance target mode. The chroma full RDO calculation circuit performs a full RDO calculation corresponding to the multiple chroma candidate modes on the chroma value of each pixel of the image block to obtain chroma full RDO results. The chroma target mode circuit determines a chroma target mode according to the luminance target mode and the chroma full RDO results. The simple RDO calculation performed on the luminance value of each pixel of the image block and the simple RDO calculation performed on the chroma value of each pixel of the image block are performed in parallel.

In the determination method for chroma intra prediction mode and the image encoding device of the present application, the simple RDO calculation performed on the luminance value of each pixel in an image block and the simple RDO calculation performed on the chroma value of each pixel in the image block are performed in parallel. As such, RDO costs of a chroma component and a luminance component are calculated in parallel in stages to determine a prediction mode for the chroma value of the pixel, thereby enhancing encoding performance.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

The technical terms given in the detailed description below are used with reference to conventional terms in the art. If some of the terms are described or defined in the present application, these terms are to be interpreted in accordance with the description and definitions given in the present application.

The disclosure of the present application includes a determination method for a chroma intra prediction mode and an image encoding device. A part or all of the determination method for a chroma intra prediction mode of the present application can be in a form of software and/or firmware, and can be performed by the image encoding device of the present disclosure.

Figure 1:
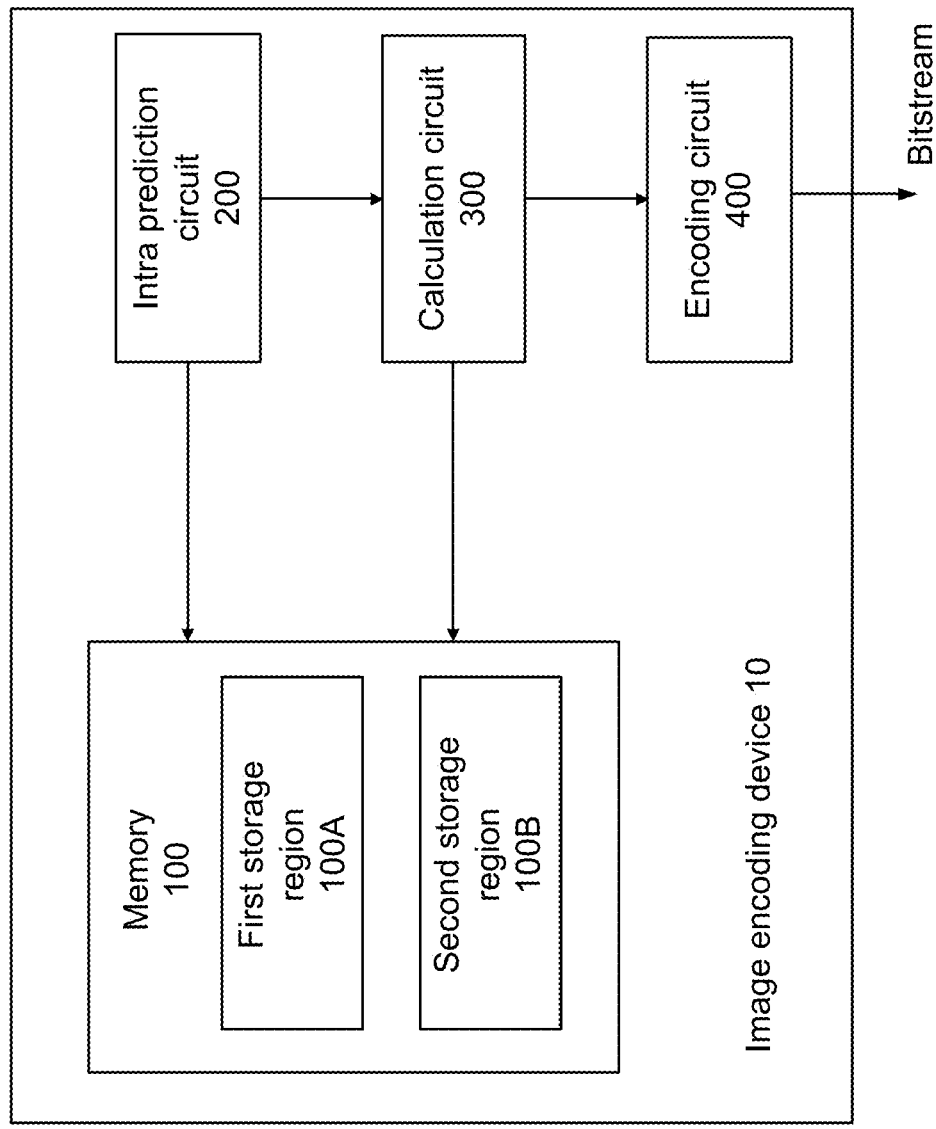
FIG. 1 is a schematic diagram of function modules of an image encoding device of the present application.

FIG. 1 shows a schematic diagram of function modules of an image encoding device of the present application. The image encoding device 10 may be a system-on-chip (SoC) image encoding chip, and includes a memory 100, an intra prediction circuit 200, a calculation circuit 300 and an encoding circuit 400. The memory 100 is a static random access memory (SRAM), in which a first storage region 100A stores original pixels of an image block to be encoded, and a second storage region 100B stores reference pixels of an image to be encoded, wherein the second storage region 100B is further used to store reconstructed pixels of an image to be encoded. In an embodiment of the present application, both of the original pixels and the reference pixels include luminance values and chroma values of the pixels. The intra prediction circuit 200 predicts the image block by using reconstructed pixels (that is, reference pixels) of an encoded image block adjacent to an image to be encoded of the same frame, so as to generate prediction pixel of the image block. The calculation circuit 300 generates, according to the pixels and the prediction pixels of the image block to be encoded, reconstructed pixels and encoding parameters of the image block to be encoded. The encoding circuit 400 generates a bitstream according to the pixels, the prediction pixels and the encoding parameters of the image block to be encoded. Operations performed by the calculation circuit 300 include a part or all of residual computing, quantization, inverse quantization, inverse transformation, reconstruction and filtering. Operation principles of the calculation circuit 300 and the encoding circuit 400 are generally known to a person skilled in the art, and are omitted herein.

In order to ensure encoding efficiency, it is necessary to select an appropriate prediction mode. The use of a rate-distortion optimization (RDO) algorithm to select optimal encoding parameters is the key to ensure video encoding efficiency. The Lagrangian optimization method is a common tool used in video rate-distortion optimization, and its rate-distortion mode decision is to calculate a Lagrangian cost representing a bit rate-distortion optimization cost (RDO cost) and selects a prediction mode with the least cost as a final encoding mode. A standard Lagrangian cost formula is as follows:

$$J = D + \lambda * R,$$

where J is the Lagrangian cost, D represents distortion of different encoding modes, λ represents a Lagrangian factor, and R represents the number of bits needed for all information (for example, change coefficient, mode information and image block division method) under a currently used prediction mode.

However, the full RDO needs to practically perform encoding once for each mode and calculate the RDO cost of each mode, and then the mode with the least RDO cost is selected as an actual encoding mode, and this process can be extremely time-consuming. When a luminance value of a pixel and a chroma value of the pixel are encoded in parallel, before the chrominance value of the pixel is encoded, an optimal mode for the luminance value of the pixel during encoding cannot be learned in advance. Thus, the DM mode cannot be used during encoding of the chroma value of the pixel, hence hindering parallel pipelined implementation of hardware.

In the present application, in order to increase the feasibility of using the DM mode for a chrominance value of a pixel during encoding, the intra prediction circuit 200 calculates an RDO cost of a luminance component and a chroma component of an image block in parallel in stages, accordingly more quickly determining an encoding mode for the luminance component and an encoding mode for the chroma component so as to determine the possibility of using the DM mode for the chroma component during encoding. For example, the chroma component and the luminance component are processed in parallel in two stages. In the first stage, a simple RDO calculation is used to calculate an RDO cost for each prediction mode of the luminance component and the chroma component so as to select respective candidate prediction modes. In the second stage, a full RDO calculation is used to calculate an RDO cost of each candidate prediction mode so as to determine target prediction modes of the luminance value and the chroma value, and to eventually determine whether the DM mode can be used for the chroma component for encoding.

The full RDO calculation calculates an RDO cost of a prediction mode according to a standard Lagrangian cost formula, wherein a distortion D is obtained by a calculation based on original pixels and reconstructed pixels of an image block. A reconstructed pixel refers to a result of performing processes including transformation, quantization, inverse quantization, inverse transformation, reconstruction and filtering on an original pixel predicted according to a prediction mode. The parameter R in RDO is the number of bits actually consumed during encoding according to a predetermined prediction mode.

In one embodiment of the present application, simple RDO calculates an RDO cost of a prediction mode according to an adjusted Lagrangian cost formula, wherein the distortion D is obtained by a calculation based on original pixels of an image block and reference pixels (non-reconstructed pixels) of the image block. Moreover, the parameter R in simple RDO is the number of bits that can be consumed during encoding according to a predetermined prediction mode but not an actual number of bits consumed. Compared to full RDO, simple RDO does not involve constructed pixels, does not involve operations such as transformation, quantization, inverse quantization, inverse transformation and reconstruction, and is capable of quickly estimating an RDO cost value of each mode although have lower accuracy.

Figure 2:
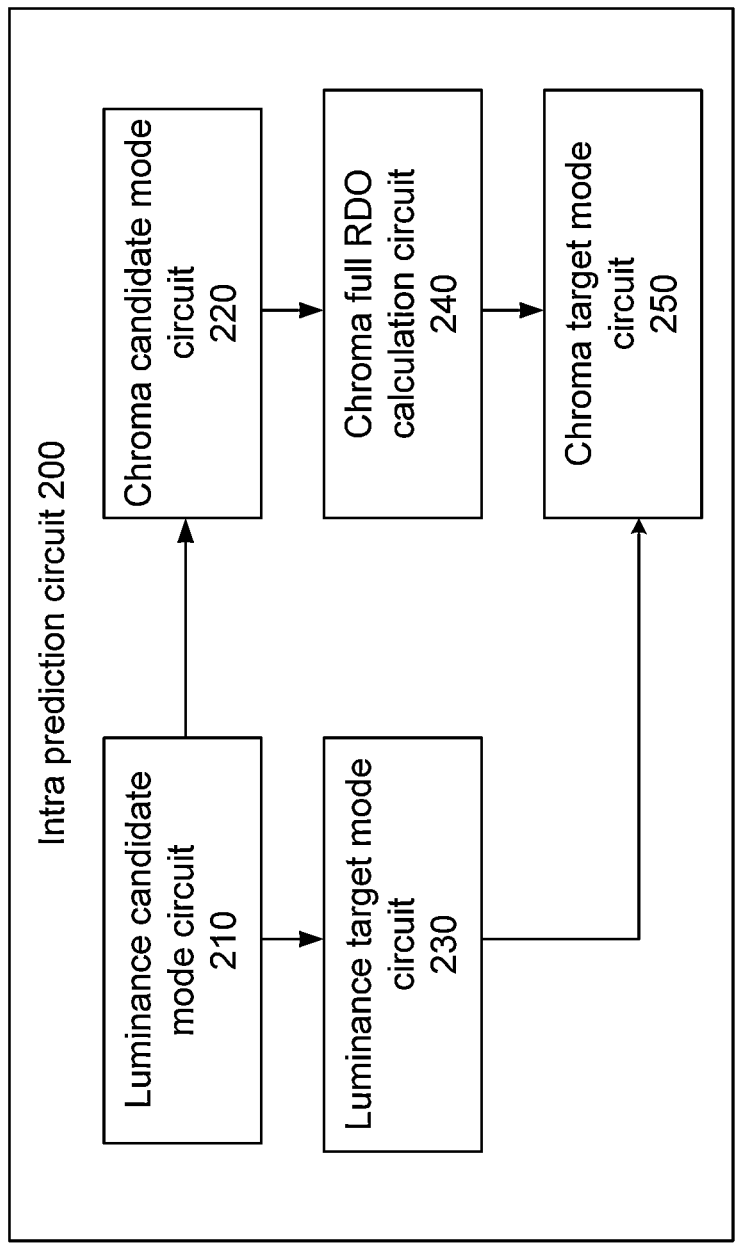
FIG. 2 is a schematic diagram of function modules of an intra prediction circuit according to a first embodiment.

FIG. 2 shows a schematic diagram of detailed function modules of the intra prediction circuit 200 according to a first embodiment. The intra prediction circuit 200 includes a luminance candidate mode circuit 210, a chroma candidate mode circuit 220, a luminance target mode circuit 230, a chroma full RDO calculation circuit 240 and a chroma target mode circuit 250.

The circuits above are individually described in detail in combination with FIG. 3 below.

Figure 3:
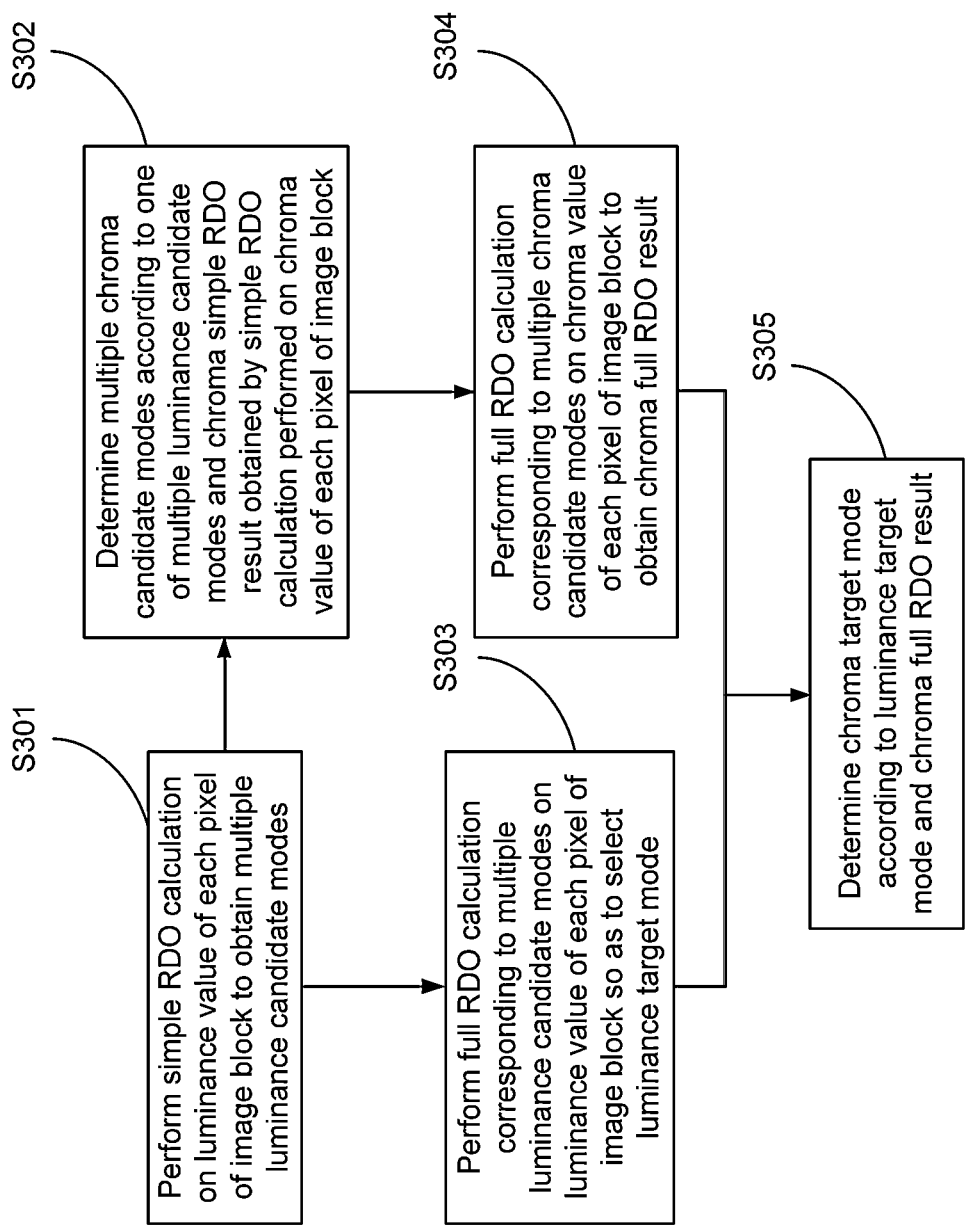
FIG. 3 is a flowchart of a determination method for a chroma intra prediction mode according to the first embodiment of the present application.

FIG. 3 shows a flowchart of a determination method for a chroma intra prediction mode according to the first embodiment of the present application. The determination method includes the following steps.

In step 301, the luminance candidate mode circuit 210 acquires a luminance value of each pixel of an image block from the memory 100, and performs a simple RDO calculation on the luminance value of each pixel of the image block to obtain multiple luminance candidate modes. For example, a simple RDO of the DC mode, the plane mode and at least one angle mode is performed on the luminance value of each pixel of the image block, and a predetermined number of (for example, two) luminance candidate modes are determined based on a result of the simple RDO.

The at least one angle mode can be obtained from 33 angle modes by means of various methods. For example, in a first method, according to simple RDO calculation results obtained by performing simple RDO calculation on 33 angle modes for the luminance value of each pixel of the image block, multiple angle modes are selected as luminance candidate modes; for example, multiple angle modes corresponding to multiple smaller simple RDO cost values are sequentially selected. In a second method, multiple basic angle modes are selected from the 33 angle modes, wherein two adjacent basic angle modes are spaced by an interval of a predetermined number of angle modes in between. Then, a main angle mode is selected according to a simple RDO calculation result obtained by performing simple RDO calculation on the multiple basic angle modes for the luminance value of each pixel of the image block. For example, a basic angle mode corresponding to the smallest simple RDO cost value is selected as the main angle mode, and expansion is performed based on the main angle mode to obtain multiple (M) angle modes that are adjacent to the basic angle mode.

The luminance candidate mode circuit 210 further transmits the selected main angle mode or M angle modes and multiple luminance candidate modes to the chroma candidate mode circuit 220.

In step 302, the chroma candidate mode circuit 220 acquires the multiple luminance candidate modes from the luminance candidate mode circuit 210 and acquires a chroma value of each pixel of the image from the memory 100, and determines multiple chroma candidate modes according to one of the multiple luminance candidate modes and a chroma simple RDO result obtained by performing a simple RDO calculation on the chroma value of each pixel of the image block. For example, the chroma candidate mode circuit 220 performs a simple RDO calculation on the planar mode, the DC mode, the vertical mode, the horizontal mode and Mangle modes for the chroma value of each pixel of the image block to obtain simple RDO calculation results. A predetermined number of (for example, two or three) chroma candidate modes are determined based on at least one of the multiple luminance candidate modes, and the simple RDO calculation results corresponding to the planar mode, the DC mode, the vertical mode, the horizontal mode and the multiple angle modes. In one embodiment, the chroma candidate mode circuit 220 acquires the main angle mode from the luminance candidate mode circuit 210, and performs expansion based on the main angle mode to obtain M angle modes. In another embodiment, the chroma candidate mode circuit 220 directly acquires the M angle modes from the luminance candidate mode circuit 210.

In one embodiment of the present application, the simple RDO calculation performed on the luminance value of each pixel of the image block in step S301 and the simple RDO calculation performed on the chroma value of each pixel of the image block in step S302 are performed in parallel. Thus, by synchronously performing the simple RDO calculations on the chroma value and the luminance value of the pixels, the overall operation time of the intra prediction circuit 200 can be reduced, so as to relief the dependency that selection of a chroma candidate mode has upon a luminance candidate mode.

In step S303, the luminance target mode circuit 230 performs a full RDO calculation corresponding to the multiple luminance candidate modes on the luminance value of each pixel of the image to select a luminance target mode. More specifically, a full RDO calculation of each luminance candidate mode is performed on the luminance value of each pixel of the image block, and a mode with a smallest full RDO cost value is accordingly selected as the luminance target mode. In step S304, the chroma full RDO calculation circuit 240 performs a full RDO calculation corresponding to the multiple chroma candidate modes on the chroma value of each pixel of the image block to obtain chroma full RDO results. More specifically, a full RDO calculation corresponding to each chroma candidate mode is performed on the chroma value of each pixel of the image block to obtain a full RDO calculation result corresponding to each chroma candidate mode, and accordingly the mode corresponding to a smallest RDO cost value is selected as a chroma first pre-target mode, and the mode corresponding to a second smallest value is selected as a chroma second pre-target mode. The chroma first pre-target mode and the chroma second pre-target mode are two modes from the planar mode, the DC mode, the vertical mode and the horizontal mode, or one mode from the planar mode, the DC mode, the vertical mode and the horizontal mode, and an angle mode.

In step S305, the chroma target mode circuit 250 determines a chroma target mode according to the luminance target mode and the chroma full RDO result.

Further, the chroma target mode circuit 250 selects a chroma first pre-target mode and a chroma second pre-target mode based on the chroma full RDO result, wherein a full RDO cost value of the chroma first pre-target mode is less than a full RDO cost value of the chroma second pre-target mode. In this embodiment, at least one of the chroma first pre-target mode and the chroma second pre-target mode includes one of the planar mode, the DC mode, the vertical mode and the horizontal mode. The chroma target mode circuit 250 determines the chroma target mode based on the consistency of the luminance target mode and the chroma first pre-target mode. More specifically, it is compared whether the luminance target mode and the chroma first pre-target value are consistent. If so, the chroma target mode circuit 250 determines that the chroma first pre-target mode is the chroma target mode and is the DM mode. When the luminance target mode and the chroma first pre-target value are not consistent, one (with optimal performance) among the planar mode, the DC mode, the vertical mode and the horizontal mode is selected from the chroma first pre-target mode and the chroma second pre-target mode as the chroma target mode. That is, when the luminance target mode and the chroma first pre-target value are not consistent and the chroma first pre-target mode is one of the planar mode, the DC mode, the vertical mode and the horizontal mode, the chroma first pre-target mode is used as the chroma target mode; when the luminance target mode and the chroma first pre-target value are not consistent and the chroma first pre-target mode is one of the M angle modes, the chroma first pre-target mode is discarded, and the chroma second pre-target mode is selected as the chroma target mode.

The chroma target mode is described in detail with combination of a determination table of the chroma target mode shown in Table-1 below.

Table-1 shows a determination table of the chroma target mode.

| Luminance Target mode | Chroma First pre-target mode | Chroma Second pre-target mode | Chroma Target mode |
|---|---|---|---|
| DC | DC | Angle 22 | DM (as DC) |
| Angle 22 | DC | Angle 22 | DC |
| Angle 22 | Angle 22 | DC | DM (as Angle 22) |
| Angle 24 | Angle 22 | DC | DC |

Referring to the first row and the third row, according to calculation results obtained by performing a full RDO calculation corresponding to the candidate modes on the chroma value of each pixel of the image block, the DC mode and Angle 22 (that is, an angle mode), respectively, is selected as the chroma first pre-target mode, and the luminance target mode is also the DC mode and Angle 22, respectively. Thus, the two are consistently, and so the chroma target mode is the DM mode.

Referring to the second row, according to calculation results obtained by performing a full RDO calculation corresponding to the candidate modes on the chroma value of each pixel of the image block, the DC mode is selected as the chroma first pre-target mode, with however the luminance target mode being the Angle 22 mode; that is, the two are inconsistent. Moreover, since the DC mode is one of four intra prediction modes (that is, the planar mode, the DC mode, the horizontal mode and the vertical mode), the chroma target mode is the DC mode.

Referring to the fourth row, according to calculation results obtained by performing a full RDO calculation corresponding to the candidate modes on the chroma value of each pixel of the image block, the Angle 22 mode is selected as the chroma first pre-target mode, and the luminance target mode is the Angle 24 mode; that is, the two are inconsistent. Since the Angle 22 mode is not one of the four standard intra prediction modes of the luminance component, the chroma first pre-target mode (the Angle 22 mode) is discarded, and the chroma second pre-target mode (that is, the DC mode with the smallest full RDO cost value in the four standard intra prediction modes) is selected as the chroma target mode.

The determination method for the chroma intra prediction encoding method can determine respective encoding modes for the luminance values and the chroma values of pixels of an image block in stages and in parallel. For example, the simple RDO calculation is performed on the luminance value of each pixel of an image block in step S301, and the simple RDO calculation can be performed in parallel on the chroma value of each pixel of the image block in step S302, and step S303 and step S304 can also be performed in parallel. Alternatively, step S301 and step S303 form a first pipeline, and step S302 and step S304 form a second pipeline, wherein both of the pipelines can be partially and synchronously performed so as to increase the probability of using the DM mode for the chroma component during encoding, further improving image encoding efficiency.

To further increase the encoding speed, the candidate modes of the luminance values and the chroma values of pixels of an image block can be determined more quickly by means of further splitting the luminance candidate mode circuit 210 and the chroma candidate mode circuit 220 into multiple circuit modules, so as to perform step S301 and step S302 in parallel to a greater extent.

Figure 4:
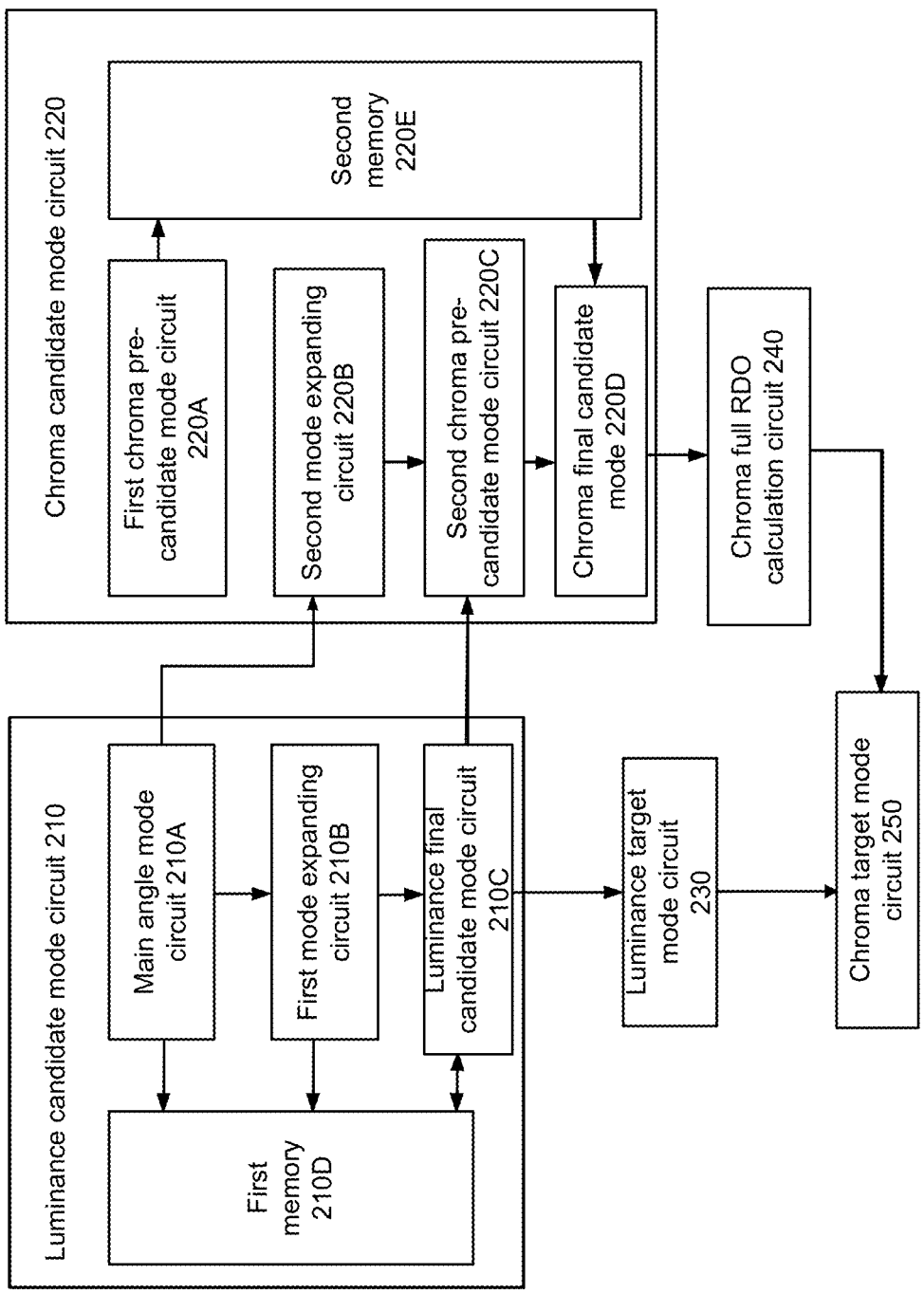
FIG. 4 is a schematic diagram of function modules of an intra prediction circuit according to a second embodiment.

Refer to FIG. 4 showing a schematic diagram of detailed function modules of the intra prediction circuit 200 in FIG. 1 according to a second embodiment. Compared to FIG. 2, FIG. 4 differs in that the luminance candidate mode circuit 210 includes a main angle mode circuit 210A, a first mode expanding circuit 210B, a luminance final candidate mode circuit 210C and a first memory 210D; the chroma candidate mode circuit 220 includes a first chroma pre-candidate mode circuit 220A, a second mode expanding circuit 220B, a second chroma pre-candidate mode circuit 220C, a chroma final candidate mode circuit 220D and a second memory 220E. The first memory 210D and the second memory 220E may be different storage regions in the memory 100.

Function details of the circuits of the luminance candidate mode circuit 210 and the chroma candidate mode circuit 220 are to be described in combination with FIG. 5 and FIG. 6 below.

Figure 5:
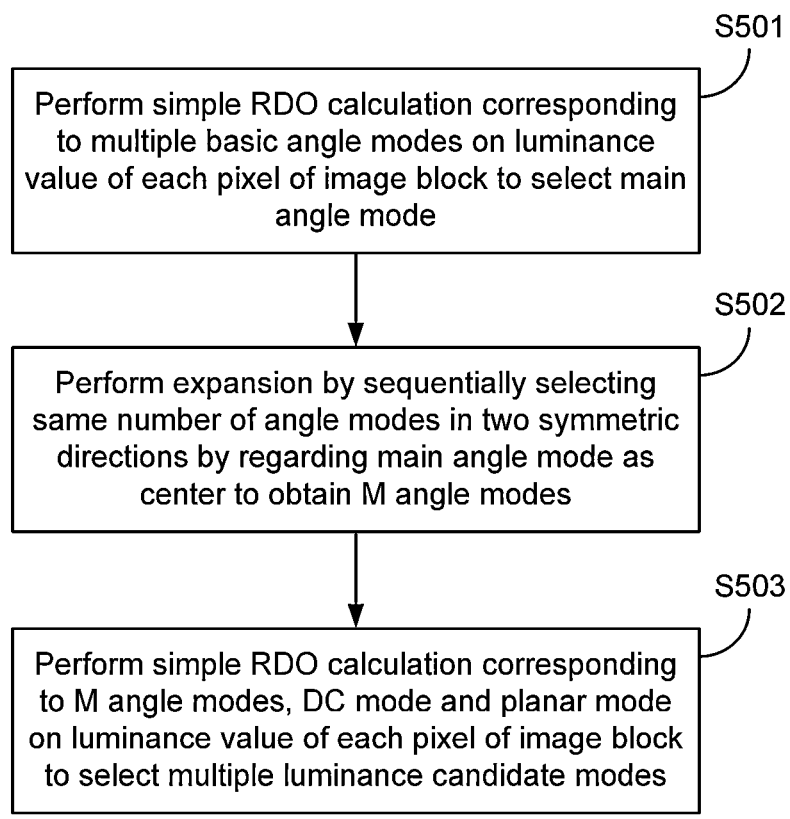
FIG. 5 is a detailed flowchart of step S301 in FIG. 3 according to an embodiment.

Refer to FIG. 5 showing a detailed flowchart of step S301 in FIG. 3, and wherein step S301 specifically includes the following steps.

In step S501, the main angle mode circuit 210 performs a simple RDO calculation corresponding to multiple basic angle modes on the luminance value of each pixel of the image block to select a main angle mode. The multiple basic angle modes are selected a predetermined number of (for example, 8) angle modes from 33 angle modes based on one pre-basic angle mode according to an interval of a predetermined number of angle modes in a direction such as the horizontal or/and vertical direction, for example, at an interval of four angle modes. The main angle mode circuit 210A performs a simple RDO calculation corresponding to the multiple basic angle modes on the luminance values of the pixels of the image block, and selects the basic angle mode corresponding to the smallest simple RDO cost value as the main angle mode.

The main angle mode circuit 210 stores the selected main angle mode and the simple RDO cost values obtained by performing the simple RDO calculation corresponding to the multiple basic angle modes on the luminance values of the pixels of the image block to the first memory 210D. The main angle mode circuit 210A further sends the main angle mode to the second mode expanding circuit 220B in the chroma candidate mode circuit 220.

In step S502, the first mode expanding circuit 210B performs expansion to obtain M angle modes by means of sequentially selecting a same number of angle modes in two symmetrical directions by regarding the main angle mode as a center, respectively. That is, the M angle modes are the same number of angle modes sequentially selected in two directions (for example, left and right, or up and down) symmetrical to the main angle mode by regarding the main angle as a center. For example, assuming the main angle mode is mode 29, the first mode expanding circuit 210B selects two modes such as modes 27 and 28 on the left and modes 30 and 31 on the right sides of mode 29, respectively, such that 5 angle modes are obtained by means of expansion by regarding mode 29 as the center. Two adjacent basic angle modes are spaced by an interval of a predetermined number of angle modes (for example, at an interval of four angle modes, as described above), but every two adjacent angle modes of the M angle modes are not spaced by any angle mode. The number of angle modes (for example, at an interval of four angle modes, as described above) spacing between the main angle mode and an adjacent basic angle mode is greater than the number of angle modes (for example, at an interval of two angle modes, as described above) spacing between the main angle mode and the angle mode located farthest away from the main angle mode in the multiple angle modes.

In step S503, the final candidate mode circuit 210C performs a simple RDO calculation corresponding to the M angle modes, the DC mode and the planar mode on the luminance values of the pixels of the image block, so as to select multiple luminance candidate modes.

More specifically, the final candidate mode circuit 210C, according to the simple RDO calculation results obtained by performing the simple RDO calculations corresponding to the M angle modes, the DC mode and the planar mode on the luminance values of the pixels of the image block (the simple RDO result of the main angle mode is stored in the first memory 210D, and can thus be acquired from the first memory 210D without involving any calculation), compares the simple RDO calculation results and selects the modes corresponding to a predetermined number of smaller simple RDO calculation results as luminance candidate modes.

It should be noted that, the main angle mode circuit 210A and the final candidate mode circuit 210C have identical circuit structures when implemented in practice. Alternatively, to simply the hardware structure of the luminance candidate mode circuit, the final candidate mode circuit 210C can directly multiplex the main angle mode circuit 210A so as to implement the functions thereof.

Figure 6:
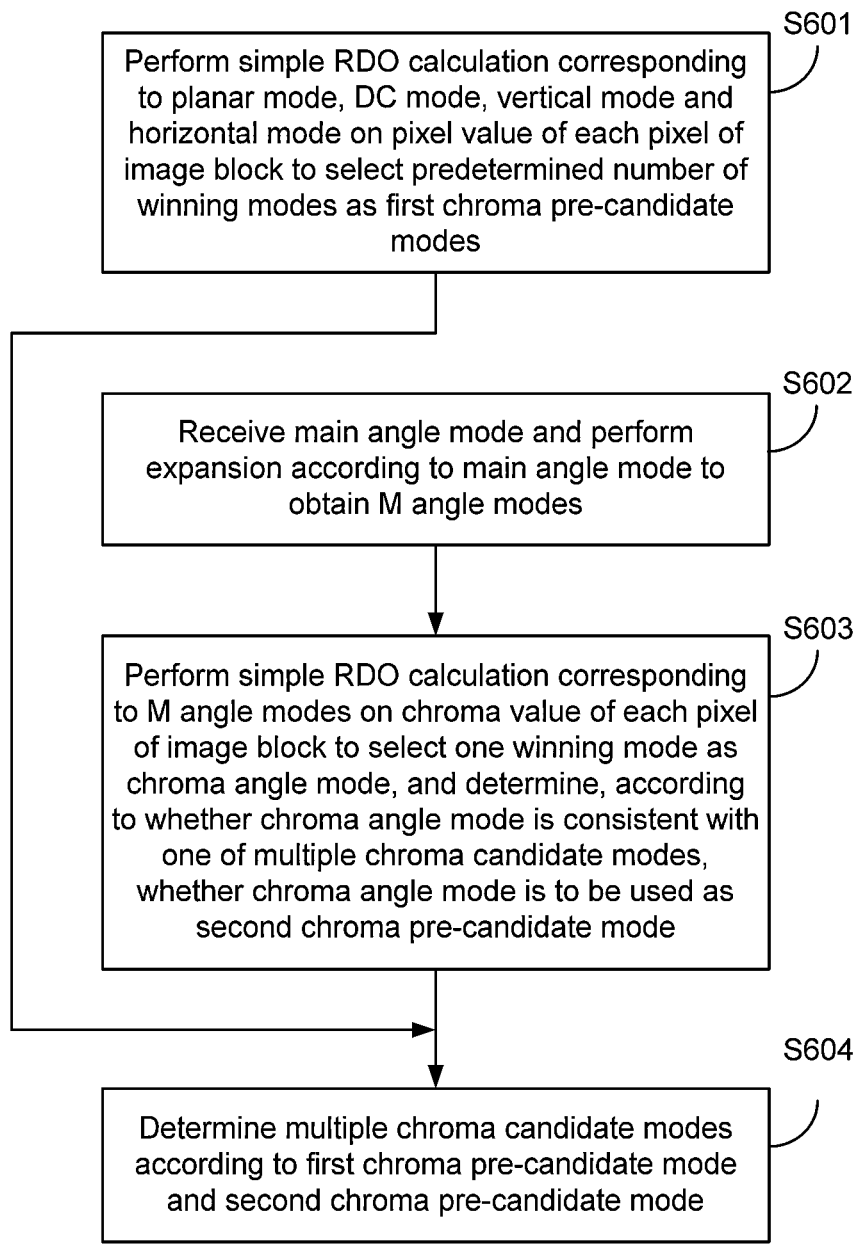
FIG. 6 is a detailed flowchart of step S302 in FIG. 3 according to an embodiment.

Refer to FIG. 6 showing a detailed flowchart of step S302 in FIG. 3, wherein step S302 specifically includes the following steps.

In step S601, the first chroma pre-candidate mode circuit 220A performs a simple RDO calculation corresponding to the planar mode, the DC mode, the vertical mode and the horizontal mode on the luminance value of each pixel of the image block, so as to select a predetermined number of (for example, two or three) winning modes as the first chroma pre-candidate modes.

A so-called winning mode herein refers to a mode of which a simple RDO cost value calculated based on simple RDO is less than an RDO cost value of other modes. The first chroma pre-candidate mode circuit 220A stores the first chroma pre-candidate modes and information thereof such as the simple RDO cost values thereof to the second memory 220E.

In order to increase an encoding speed, step S501 and step S601 can be performed in parallel. That is, when the main angle mode circuit 210A performs the selecting of the main angle mode, the first chroma pre-candidate mode circuit 220A performs in parallel the selecting of the first chroma pre-candidate modes from the planar mode, the DC mode, the vertical mode and the horizontal mode.

In step S602, the second mode expanding circuit 220B receives the main angle mode and performs expansion according to the main angle mode to obtain M angle modes.

The first mode expanding circuit 210B and the second mode expanding circuit 22B can simultaneously acquire the main angle mode from the main angle mode circuit 210A, so as to perform the expansion in parallel; that is, step S502 and step S602 can be performed in parallel. In one embodiment, the second chroma pre-candidate mode circuit 220C can receive the M angle modes obtained from expansion based on the main angle from the first mode expanding circuit 210B. Thus, the second mode expanding circuit 220B and step S602 can be omitted.

In step S603, the second chroma pre-candidate mode circuit 220C performs a simple RDO calculation corresponding to the M angle modes on the chroma value of each pixel of the image block so as to select a winning mode as a chroma angle mode, and determines, according to whether the chroma angle mode is the same as one of the multiple luminance candidate modes, whether the chroma angle mode can be used as a second chroma pre-candidate mode.

More specifically, the second chroma candidate mode circuit 220C receives the selected luminance candidate modes from the luminance final candidate mode circuit 220C, and determines whether the received luminance candidate modes include an angle mode. If so, the second chroma pre-candidate mode circuit 220C compares whether the chroma angle mode is consistent with the angle mode in the luminance candidate modes, and uses the selected chroma angle mode as the second chroma pre-candidate mode if so, otherwise does not use the chroma angle mode as the second chroma pre-candidate mode. That is, when the chroma angle mode and one of the multiple luminance candidate modes are the same angle mode, the chroma angle mode can be used as the second chroma pre-candidate mode.

In other embodiments, the second chroma pre-candidate mode circuit 220C further determines, according to whether the multiple luminance candidate modes received from the luminance final candidate mode circuit 210C include an angle mode, whether to perform an operation thereof and step S603. When the received multiple luminance candidate modes do not include any angle mode, it is not required to perform step S603. Thus, the operation time of the chroma candidate mode circuit 220 can be saved.

In step S604, the chroma final candidate mode 220D determines multiple chroma candidate modes according to the first chroma pre-candidate mode and the second chroma pre-candidate mode. The multiple chroma candidate modes at least include a mode in the first chroma pre-candidate mode. When the angle mode included in the luminance candidate mode is consistent with the angle mode included in the second chroma pre-candidate mode, the chroma candidate mode then includes the second chroma pre-candidate mode.

In combination with FIG. 5 and FIG. 6, step S501 and step S601, and step S502 and step S602 can be performed synchronously. Moreover, with the simple RDO, candidate modes of luminance values and chroma values can be quickly selected without involving operations such as transformation, quantization, inverse quantization, inverse transformation and reconstruction. Then, full RDO cost values of candidate modes of the luminance values and chroma values of the pixels of the image block are respectively calculated based on full RDO to determine the luminance target mode of the luminance component and the chroma target mode of the chroma component, so as to accordingly determine whether the DM mode can be used for the chroma pixels for encoding to thereby increase the encoding speed and saving encoding bit rate.

In conclusion, in the present application, by means of performing a simple RDO calculation on the luminance value of each pixel of an image block and performing a simple RDO calculation on the chroma value of each pixel of the image block in parallel, in parallel processing for prediction modes of luminance values and chroma values of the pixels of the image block based on simple RDO and full RDO in stages is implemented. Thus, not only speeds for determining a luminance target mode and a chroma target mode are increased, but also the luminance target mode during encoding of the luminance values of the pixels of the image block can be acquired in real-time during encoding of the chroma values of the pixels of the image block, so as to determine whether the DM mode can be used for encoding during the encoding of the chroma values and to thereby improve encoding performance and efficiency.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A determination method for a chroma intra prediction encoding mode, the method comprising:
    performing a simple rate-distortion optimization (RDO) calculation on a luminance value of each pixel of an image block to obtain a plurality of luminance candidate modes;
    determining a plurality of chroma candidate modes according to one of the plurality of luminance candidate modes and a chroma simple RDO result obtained by performing a simple RDO calculation on a chroma value of each pixel of the image block;
    performing a full RDO calculation corresponding the plurality of luminance candidate modes on the luminance value of each pixel of the image block to select a luminance target mode;
    performing a full RDO calculation corresponding to the plurality of chroma candidate modes on the chroma value of each pixel of the image block to obtain chroma full RDO results; and
    determining a chroma target mode according to the luminance target mode and the chroma full RDO results;
    wherein, the simple RDO calculation performed on the luminance value of each pixel of the image block and the simple RDO calculation performed on the chroma value of each pixel of the image block are performed in parallel.

2. The determination method according to claim 1, further comprising:
    selecting a chroma first pre-target mode and a chroma second pre-target mode based on the chroma full RDO results, wherein a full RDO cost value of the chroma first pre-target mode is less than a full RDO cost value of the chroma second pre-target mode;
    determining, when the chroma first pre-target mode is consistent with the luminance target mode, the chroma first pre-target mode as the chroma target mode, wherein the chroma target mode is a DM mode.

3. The determination method according to claim 2, wherein
    at least one of the chroma first pre-target mode and the chroma second pre-target mode comprises one of a planar mode, the DC mode, a vertical mode and a horizontal mode; and
    when the chroma first pre-target mode is inconsistent with the luminance target mode, if the chroma first pre-target mode is one of the planar mode, the DC mode, the vertical mode and the horizontal mode, the chroma first pre-target mode is determined as the chroma target mode, or if the chroma first pre-target mode is one of a plurality of angle modes, the chroma second pre-target mode is determined as the chroma target mode.

4. The determination method according to claim 1, wherein the performing of a simple RDO calculation on a luminance value of each pixel of an image block to obtain a plurality of luminance candidate modes comprises:
    performing a simple RDO calculation corresponding to a plurality of basic angle modes on the luminance value of each pixel of the image block to select a main angle mode, wherein two adjacent of the basic angle modes are spaced by an interval of a predetermined number of angle modes;
    performing expansion to obtain M angle modes by means of sequentially selecting a same number of angle modes in two symmetrical directions by regarding the main angle mode as a center, respectively; and
    performing a simple RDO calculation corresponding to the M angle modes, the DC mode and the planar mode on the luminance value of each pixel of the image block, so as to select the plurality of luminance candidate modes.

5. The determination method according to claim 4, wherein the determining of a plurality of chroma candidate modes according to one of the plurality of luminance candidate modes and a chroma simple RDO result obtained by performing a simple RDO calculation on a chroma value of each pixel of the image block comprises:
    performing a simple RDO calculation corresponding to a planar mode, a DC mode, a vertical mode and a horizontal mode on the luminance value of each pixel of the image block, so as to select a predetermined number of winning modes as the first chroma pre-candidate modes;
    receiving the main angle mode and performing expansion according to the main angle mode to obtain the M angle modes, or receiving the M angle modes;
    performing a simple RDO calculation corresponding to the M angle modes on the chroma value of each pixel of the image block to select a winning mode as a chroma angle mode, and determining, according to whether the chroma angle mode is the same as one of the plurality of luminance candidate modes, whether the chroma angle mode is to be used as a second chroma pre-candidate mode; and
    determining a plurality of chroma candidate modes according to the first chroma pre-candidate mode and the second chroma pre-candidate mode;
    wherein, the simple RDO calculation corresponding to the plurality of basic angle modes performed on the luminance value of each pixel of the image block and the simple RDO calculation corresponding to the planar mode, the DC mode, the vertical mode and the horizontal mode performed on the chroma value of each pixel of the image block are performed in parallel.

6. The determination method according to claim 5, wherein
    when the chroma angle mode is consistent with one of the plurality of luminance candidate modes, the chroma angle mode is determined to be used as the second chroma pre-candidate mode, so that the plurality of chroma candidate modes comprise the first chroma pre-candidate mode and the second chroma pre-candidate mode; or
    when the chroma angle mode is different from all of the plurality of luminance candidate modes, the chroma angle mode is determined not to be used as the second chroma pre-candidate mode, so that the plurality of chroma candidate mode comprise only the first chroma pre-candidate mode.

7. The determination method according to claim 4, wherein the determining of a plurality of chroma candidate modes according to one of the plurality of luminance candidate modes and a chroma simple RDO result obtained by performing a simple RDO calculation on a chroma value of each pixel of the image block comprises:
performing a simple RDO calculation corresponding to a planar mode, a DC mode, a vertical mode and a horizontal mode on the luminance value of each pixel of the image block, so as to select a predetermined number of winning modes as the first chroma pre-candidate modes;
determining whether the plurality of luminance candidate modes comprise one of the M angle modes; and
when the plurality of luminance candidate modes comprises none of the M angle modes, determining the plurality of chroma candidate modes according to the first chroma pre-candidate mode.

8. An image encoding device, comprising:
a luminance candidate mode circuit, acquiring a luminance value of each pixel of an image block from a memory, and performing a simple rate-distortion optimization (RDO) calculation on the luminance value of each pixel of the image block to obtain a plurality of luminance candidate modes;
a chroma candidate mode circuit, acquiring a chroma value of each pixel of the image block from the memory, and determining a plurality of chroma candidate modes according to one of the plurality of luminance candidate modes and a chroma simple RDO result obtained by performing a simple RDO calculation on the chroma value of each pixel of the image block;
a luminance target mode circuit, performing a full RDO calculation corresponding to the plurality of luminance candidate modes on the luminance value of each pixel of the image block to select a luminance target mode;
a chroma full RDO calculation circuit, performing a full RDO calculation corresponding to the plurality of chroma candidate modes on the chroma value of each pixel of the image block to obtain chroma full RDO results;
a chroma target mode circuit, determining a chroma target mode according to the luminance target mode and the chroma full RDO results;
wherein, the simple RDO calculation performed on the luminance value of each pixel of the image block by the luminance candidate mode circuit and the simple RDO calculation performed on the chroma value of each pixel of the image block by the chroma candidate mode circuit are performed in parallel.

9. The image encoding device according to claim 8, wherein
the chroma full RDO result comprises a chroma first pre-target mode and a chroma second pre-target mode, wherein a full RDO cost value of the chroma first pre-target mode is less than a full RDO cost value of the chroma second pre-target mode;
when the chroma first pre-target mode is consistent with the luminance target mode, the chroma target mode circuit determines the chroma first pre-target mode as the chroma target mode, wherein the chroma target mode is a DM mode.

10. The image encoding device according to claim 9, wherein
at least one of the chroma first pre-target mode and the chroma second pre-target mode comprises one of a planar mode, the DC mode, a vertical mode and a horizontal mode;
when the chroma first pre-target mode is inconsistent with the luminance target mode, if the chroma first pre-target mode is one of the planar mode, the DC mode, the vertical mode and the horizontal mode, the chroma target mode circuit determines the chroma first pre-target mode as the chroma target mode; or
if the chroma first pre-target mode is one of the plurality of angle modes, the chroma target mode circuit determines the chroma second pre-target mode as the chroma target mode.

11. The image decoding device according to claim 8, wherein the luminance candidate mode circuit comprises:
a main angle mode circuit, performing a simple RDO calculation corresponding to a plurality of basic angle modes on the luminance value of each pixel of the image block to select a main angle mode, wherein two adjacent of the basic angle modes are spaced by an interval of a predetermined number of angle modes;
a first mode expanding circuit, performing expansion to obtain M angle modes by means of sequentially selecting a same number of angle modes in two symmetrical directions by regarding the main angle mode as a center, respectively; and
a luminance final candidate mode circuit, performing a simple RDO calculation corresponding to the M angle modes, the DC mode and the planar mode on the luminance value of each pixel the image block, so as to select the plurality of luminance candidate modes.

12. The image decoding device according to claim 11, wherein the chroma candidate mode circuit comprises:
a first chroma pre-candidate mode circuit, performing a simple RDO calculation corresponding to a planar mode, a DC mode, a vertical mode and a horizontal mode on the luminance value of each pixel of the image block, so as to select a predetermined number of winning modes as the first chroma pre-candidate modes;
a second chroma pre-candidate mode circuit, performing a simple RDO calculation correspond to the M angle modes on the chroma value of each pixel of the image block to select a winning mode as a chroma angle mode, and determining, according to whether the chroma angle mode is the same as one of the plurality of luminance candidate modes, whether the chroma angle mode is to be used as a second chroma pre-candidate mode; and
a chroma final candidate mode, determining a plurality of chroma candidate modes according to the first chroma pre-candidate mode and the second chroma pre-candidate mode;
wherein, the simple RDO calculation corresponding to the plurality of basic angle modes performed on the luminance value of each pixel of the image block by the main angle mode circuit and the simple RDO calculation corresponding to the planar mode, the DC mode, the vertical mode and the horizontal mode performed on the chroma value of each pixel of the image block by the first chroma pre-candidate mode circuit are performed in parallel.

13. The image encoding device according to claim 12, wherein when the chroma angle mode is consistent with one of the plurality of luminance candidate modes, the chroma final candidate mode circuit determines that the chroma angle mode to be used as the second chroma pre-candidate mode, so that the plurality of chroma candidate mode comprise the first chroma pre-candidate mode and the second chroma pre-candidate mode; or when the chroma angle mode is different from all of the plurality of luminance candidate modes, the chroma final candidate mode circuit determines that the chroma angle mode is not to be used as the second chroma pre-candidate mode, so that the plurality of chroma candidate mode comprise only the first chroma pre-candidate mode.

14. The image decoding device according to claim 11, wherein the chroma candidate mode circuit comprises:

a first chroma pre-candidate mode circuit, performing a simple RDO calculation corresponding to a planar mode, a DC mode, a vertical mode and a horizontal mode on the luminance value of each pixel of the image block, so as to select a predetermined number of winning modes as the first chroma pre-candidate modes;

a second chroma pre-candidate mode circuit, determining whether the plurality of luminance candidate modes comprise one of the M angle modes; and a chroma final candidate mode circuit, determining the plurality of chroma candidate modes according to the first chroma pre-candidate mode when the plurality of luminance candidate modes comprises none of the M angle modes.

* * * * *